UNITED STATES PATENT OFFICE.

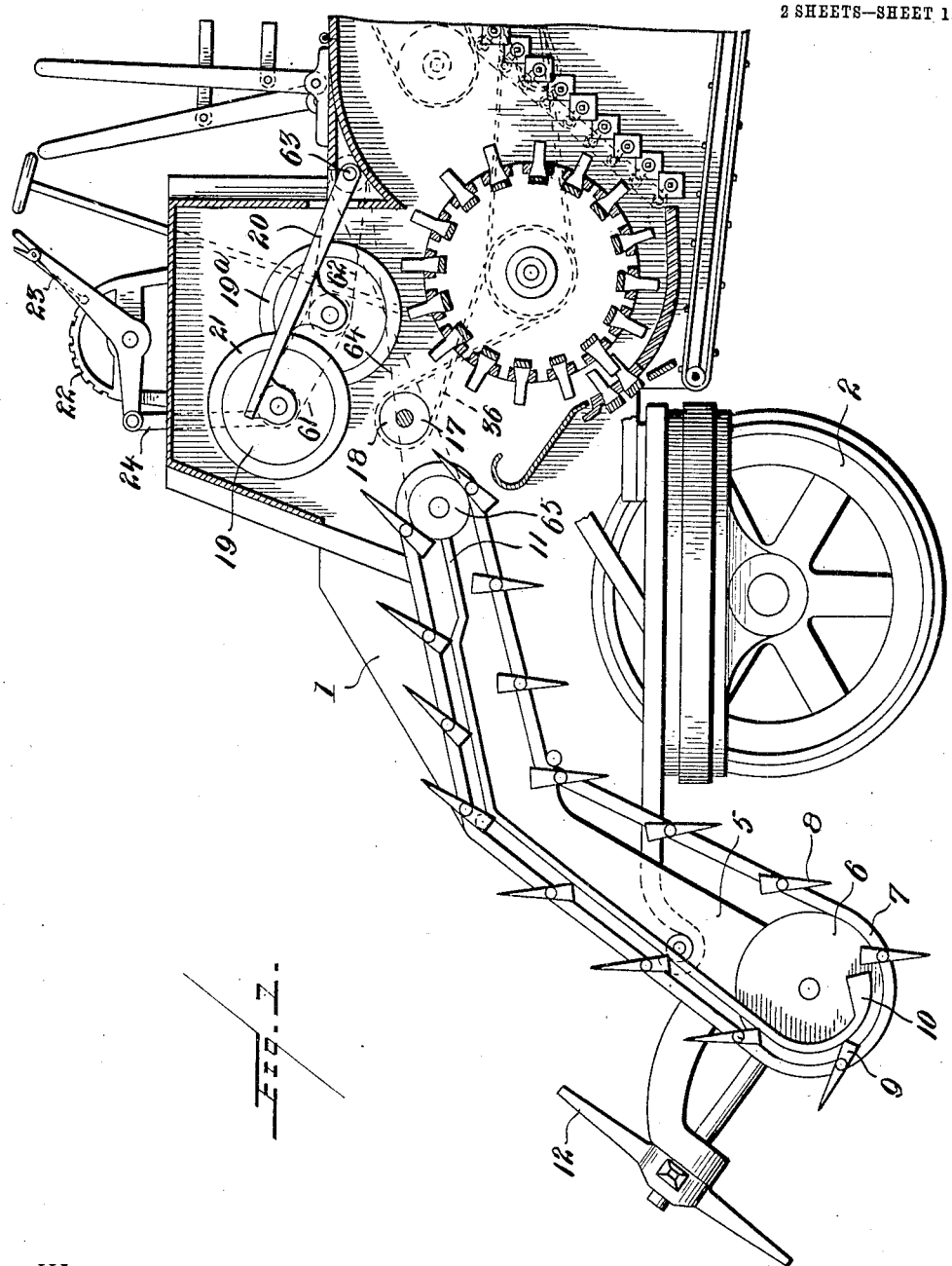

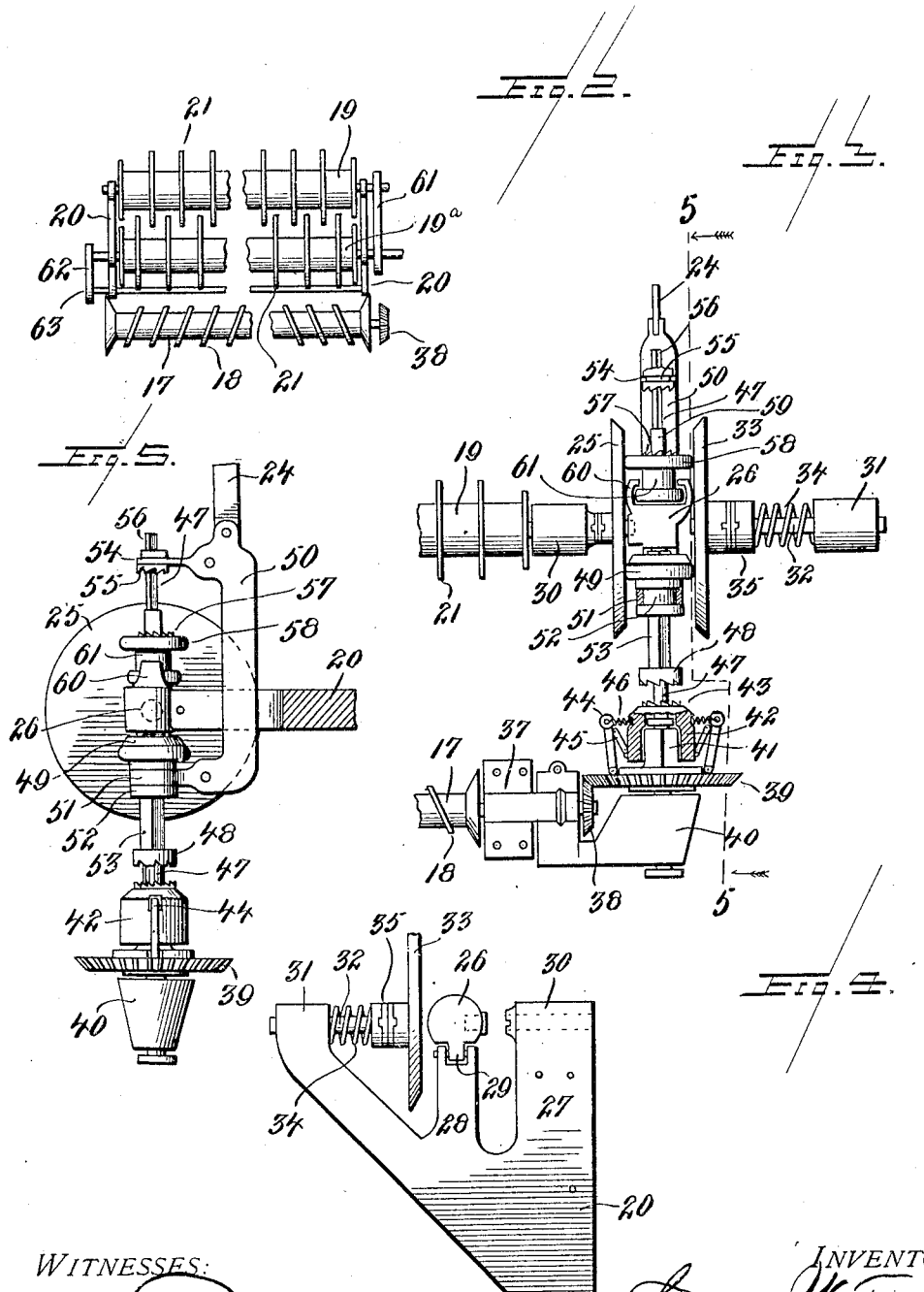

GEORGE W. TICE, OF RILEY CENTER, MICHIGAN, ASSIGNOR OF ONE-HALF TO ALLEN K. TICE, OF LARIMORE, NORTH DAKOTA.

BAND-CUTTER AND FEEDER.

No. 871,742.     Specification of Letters Patent.     Patented Nov. 19, 1907.

Original application filed November 23, 1905, Serial No. 288,763. Divided and this application filed September 11, 1906. Serial No. 334,122.

*To all whom it may concern:*

Be it known that I, GEORGE W. TICE, citizen of the United States, residing at Riley Center, in the county of St. Clair, State of Michigan, have invented certain new and useful Improvements in Band-Cutters and Feeders, comprising a division of my original application filed November 23, 1905, Serial No. 288,763, of which the following is a specification, reference being had therein to the accompanying drawing.

This invention relates to a band cutter and feeder, and particularly to a novel construction of the band cutting rollers and coöperating spreader roller for conveying material to the threshing cylinders.

The invention has for an object to provide an improved construction of these feeding and spreading rollers and also for the driving mechanism therefor whereby the feed of the rollers may be governed relative to the volume of material while maintaining their constant driving relation, and are adapted to reverse their feed if a sufficiently large volume of material be fed thereto so as to throw back the surplus material until the parts are restored to their normal relative position whereby means are provided for automatically governing the feed to the threshing cylinder.

Other and further objects and advantages of the invention will be hereinafter set forth and the novel features thereof defined by the appended claims.

In the drawing:—Figure 1 is a vertical section through a portion of a threshing machine showing the band cutter applied thereto; Fig. 2 is a plan of the cutting and spreading rollers; Fig. 3 is a detail elevation with parts in section of the driving mechanism for these rollers, Fig. 4 is a similar view of the supporting frame for part of this driving mechanism, and Fig. 5 is a section on line 5—5, Fig. 3.

Like numerals of reference refer to like parts throughout the several views of the drawings.

The numeral 1 designates the frame of the machine which may be of any suitable character and is supported at the feeding end by means of a traction wheel 2. When the machine is to be used for the purpose of feeding bundles tied in the usual manner, the construction and arrangement of parts shown in Fig. 1 is used where a depending frame 5 is provided having at its lower end a bearing wheel 6 over which the belt 7 of the feeder rakes passes. These rakes 8 are pivotally mounted upon this belt or carrier, and provided at their inner ends with an arm 9 adapted to engage the rake trip 10 which extends upward along the ascending portion of the apron. The rakes are thus thrown into a position obliquely to the apron and held there during the travel of the rakes in contact with the trip and until they reach the deflected portion 11 thereof, when they are released from their trip and permitted to fall so that the bundle or material carried thereby is free to be received into the machine. For the purpose of directing these bundles upon this apron or rake, the reels 12 are provided.

The bundle delivered by the pivoted rakes is received by the spreader roller 17, which is provided with plates 18 disposed spirally or diagonally to the longitudinal axis of the roller so as to feed the grain longitudinally of the roller to spread a layer of equal thickness after the cutting of the bands thereon and before its introduction to the threshing cylinders. This band cutting is accomplished by means of the rollers 19 and 19$^a$ mounted in a pivoted arm 20 above the spreader roller and each provided with peripheral blades or other knives 21 disposed in lines overlapping each other, as shown in Fig. 2. The bundle spreading roller is adapted to be driven at a greater speed than the band cutting rollers in any desired manner, for instance, as shown in Fig. 3. This is accomplished by an adjustment of the arm 20 carrying these rollers by any suitable means, for instance, the segment 22 and ratchet lever 23 having a link connection 24. The band cutting roller has secured thereto a friction disk 25 which is also pivotally mounted in the boxing 26. This boxing is carried by the machine frame from the supporting frame 27 having an arm 28 extending therefrom and provided with a pivotal connection 29 for the boxing, see Fig. 4. At the end of the frame a bearing 30 is provided for the shaft of the roller 19 and at the opposite end a bearing 31 is provided for the shaft 32 carrying the friction disk 33 which is held under spring tension by means of the spring 34 disposed between the hub 35 of said disk and the bearing 31. The spreader roller 17 is driven in any desired manner, for instance, by means of the crossed belt 36, shown by dotted lines in Fig. 1, and has an extended shaft mounted in bearings 37 and provided with a bevel gear 38 meshing with a coöperating bevel gear 39 supported by the bearing 40. This gear 39 is provided with an angular hub 41 over which the correspondingly shaped collar 42 is adapted to slide and is provided upon its upper face with a clutch member 43. This collar and clutch are lifted upward in the rotation of the pinion by means of the weighted arms 44 connected by links 45 with the collar 42 and normally restored by means of springs 46. The gear 39 is freely rotatable upon the lower end of the shaft 47, and this shaft has secured thereto a clutch face 48 adapted to coöperate with the member 43, and is provided at its upper end with a friction driving wheel 49 adapted for movement longitudinally upon the shaft 47. This wheel 49 is mounted in a frame 50 connecting with the adjusting lever 23. This frame 50 is provided with a yoke 51 embracing the hub 52 of the friction drive 49, which is slidingly mounted upon the angular portion 53 of the shaft 47. The frame is also provided with a yoke 54 embracing the clutch member 55 disposed upon the upper angular end 56 of the shaft 47. When the parts are raised in position by means of this frame, the clutch 57 carried by the power transmitting wheel 58, which is slidingly mounted upon the circular portion 59 of the shaft 47, is brought into contact with the clutch 55 to reverse the direction of drive. It will also be observed that the boxing 26 is provided with a socket 60 in which the hub 61 of the power transmitting wheel 58 is adapted to seat so that these parts may be shifted to vary the position of the driving wheel and power transmitting wheel relatively to the centers of the friction disks 25 and 33. By this means the cutter roll 19 is driven from the spreading roll and its associate roll 19ª is driven therefrom by means of the belt 61, as shown in Fig. 2. From the opposite end of the shaft of the roll 19ª, a belt 62 extends to the pivotal point 63 of the arm 20 from which a crossed belt 64 extends to the rake driving pulley 65. With this construction it will be seen that in the operation of feeding material to the machine, the volume fed will be in proportion to the spaces between the feeding and spreading rolls, and should a larger volume than intended pass between said rolls, it will raise the frame carrying the cutting rolls, while maintaining the same driving relation to the mechanism hereinbefore described. Should the volume fed be so large as to entirely withdraw the friction drive roll from contact with its disks, this would cause the disk, and also the shaft of the cutter to stop and free the connections hereinbefore described and also the feeding belt, while the spreading and rolls will continue its operation until the volume of feed be reduced so as to permit the parts to regain their initial operation. Should the volume be great enough to raise the parts carried by the cutting roll 19 sufficiently to engage the clutch members 55 and 57, the driving action would be reversed for both the rakes and cutting knives thus throwing back the surplus material, while the parts would return to their ordinary operation as soon as restored to their normal position. The foregoing construction provides means for automatically governing the feed to the threshing cylinder.

Having now described my invention and set forth its merits, what I claim and desire to secure by Letters Patent is:—

1. In a machine of the class described, a spreading roller, a support mounted for movement toward and from said roller, a feed roller carried by said support, a driving connection from the spreading roller to the feed roller, and means disposed relative to said connection and controlled by the continued movement of said support to automatically regulate the speed of rotation, stop and reverse one of said rollers in its relative movement to the other.

2. In a machine of the class described, a spreading roller, a support mounted for movement toward and from said roller, a feed roller carried by said support and provided with a friction driving disk, a friction wheel bearing upon said disk and carrying a clutch member, a gear driven from the spreading roller and having a hub, and a centrifugally operated clutch member slidably mounted upon said hub and rotated by said gear to engage the clutch member upon the friction wheel shaft.

3. In a machine of the class described, a threshing cylinder, driven band cutters disposed adjacent thereto, a spreading roller having oppositely disposed blades thereon, a pivoted arm for supporting said band cutters, a gearing extending from said spreading roller to one of the band cutters for driving the same at a relatively different speed and means controlled by the travel of said arm to regulate the speed of rotation of said cutter.

4. In a machine of the class described, a threshing cylinder, driven band cutters disposed adjacent thereto, a spreading roller having oppositely disposed blades thereon, a pivoted arm for supporting said band cutters, a gearing extending from said spreading roller to one of said band cutters for driving the same at a relatively different speed, a feeding rake adapted to deliver to said roller and band cutters, and means for driving said rake from said band cutters.

5. In a machine of the class described, a threshing cylinder, driven band cutters disposed adjacent thereto, a spreading roller having oppositely disposed blades thereon, a pivoted arm for supporting said band cutters, a gearing extending from said spreading roller to one of said band cutters for driving the same at a relatively different speed, a feeding rake adapted to deliver to said roller and band cutters, means for driving said rake from said band cutters, a reel carried at the lower end of said rake, and means for driving said reel from said rake.

6. In a machine of the class described, a spreading roller carried by a support, a feed roller mounted for movement relative thereto, a driving connection from the spreading roller to the feed roller and means controlled by the travel of said support to automatically reverse the rotation of the feed roller during their separation.

7. In a machine of the class described, a spreading roller, a feed roller mounted for movement relative thereto, and a driving connection from the spreading roller to the feed roller adapted to reduce the speed of the latter, stop the rotation thereof and reverse the direction of said rotation in the continued separation of the feed roller from the spreading roller.

8. In a machine of the class described, a spreading roller, a feeding and cutting roller mounted for movement relative thereto, a driving disk carried by the feed roller, a driving wheel actuated by the spreading roller and engaging said disk, and a reversing drive wheel engaging said disk and adapted to be clutched into driving connection by the movement of the feed roller relative to the spreading roller.

9. In a machine of the class described, a feed roller provided with a friction driving disk, an opposite friction disk, driving wheels connected together and disposed between said disks in engagement therewith at opposite sides of the axes of the disks, a spreading roller operatively connected with the driving shaft for said wheels, and means for shifting said wheels to clutch either thereof in driving relation with said shaft.

10. In a machine of the class described, a feed roller provided with a driving disk, an opposite spring pressed disk, a driving wheel disposed between said disks, means for shifting said wheel relative to the center of said disks, a bearing for the feed roller disk, a reversing driving wheel mounted in said bearing and provided with a clutch face, and a relatively fixed driven clutch member adapted to be engaged by said face in the shifting of said bearing and parts carried thereby.

11. In a machine of the class described, a spreading roller provided with a bevel pinion, a coöperating bevel gear provided with a centrifugally operated clutch, a band cutter provided with a frictional drive wheel, a friction wheel carried by said clutch, and an operating lever connected to shift said friction wheel upon the shaft of said clutch.

12. In a machine of the class described, a spreading roller provided with a bevel pinion, a coöperating bevel gear provided with a centrifugally operated clutch, a band cutter provided with a frictional drive wheel, a friction wheel carried by said clutch, an operating lever connected to shift said friction wheel upon the shaft of said clutch, and a reversing drive wheel adapted to engage a driving clutch in the movement of said operating lever.

In testimony whereof I affix my signature in presence of two witnesses.

GEORGE W. TICE.

Witnesses:
FRANK L. FORLOW,
H. W. CURRY.